T. T. BAKER.
PHOTOTELEGRAPHY.
APPLICATION FILED JAN. 20, 1910.
1,026,297.
Patented May 14, 1912.
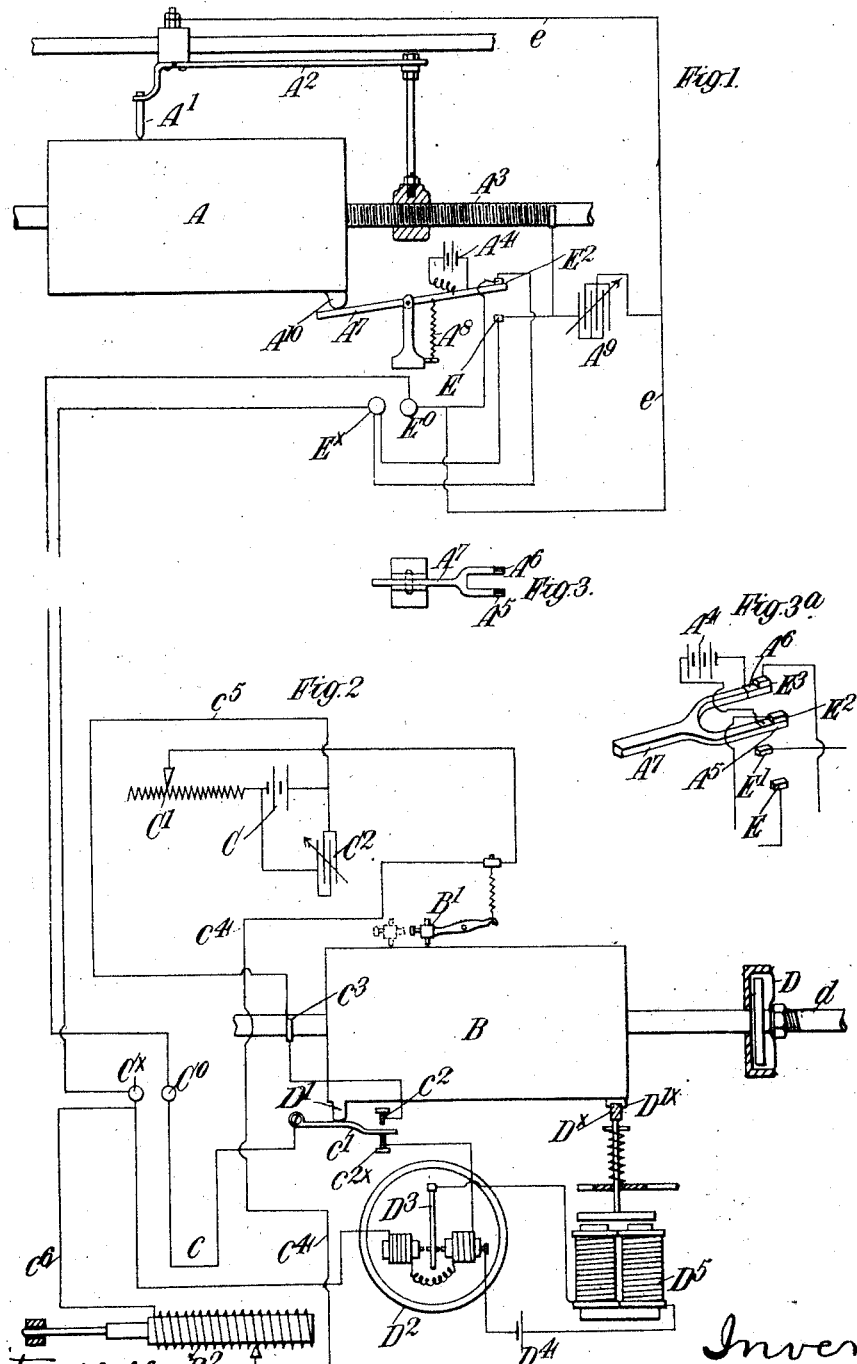
Witnesses
M. F. Keating
E. F. Adams
Inventor
Thomas Thorne Baker
By Atty Charles J. Kintner

UNITED STATES PATENT OFFICE.

THOMAS THORNE BAKER, OF CRICKLEWOOD, ENGLAND.

PHOTOTELEGRAPHY.

1,026,297.
Specification of Letters Patent.
Patented May 14, 1912.

Application filed January 20, 1910. Serial No. 539,175.

*To all whom it may concern:*

Be it known that I, THOMAS THORNE BAKER, a subject of the King of Great Britain, residing at 15 Grosvenor Gardens, Cricklewood, in the county of Middlesex, England, have invented certain new and useful Improvements in Phototelegraphy, of which the following is a specification.

This invention relates to phototelegraphy, the chief object being to enable half tone photographs at the transmitting station to be reproduced directly at the receiving station with sharp definition.

Heretofore in connection with the electrical transmission and reception of photographs it has not been practicable to reproduce the photograph directly nor with sufficient distinctness to enable satisfactory half tone effects to be obtained. For instance, in the Korn or the Belin receiving apparatus the photograph transmitted is reproduced upon a photographic film which has to be developed before the actual photograph is seen. Moreover the intensity of the light that falls upon the photographic film on which the photograph is being reproduced is regulated by means of a shutter or mirror, which is attached to fine wires and is actuated to an extent corresponding to the strength of the current transmitted along the line. When a half tone photograph is used at the transmitting station, the interruptions of the current transmitted along the line are very rapid owing to the numerous lines on the photograph at the transmitting station. Consequently the wires, to which the shutter or mirror is attached, are set in vibration and definite frequencies of vibration are attained, which take some time to die out when the cause of the vibration ceases. Hence blank spaces in the photograph at the transmitting station are not reproduced with satisfactory sharpness at the receiving station, and the photograph reproduced there has a blurred appearance.

In the present invention, the material on the surface of which the half tone photograph is to be reproduced is of the kind that can be discolored by the action of an electric current passing through it, and the electric current arriving at the receiving station from the station at which the photograph to be reproduced is causing interruptions of the electric current is directly utilized for this purpose. This electrical method of direct reproduction in place of the previous indirect optical methods obviates the defects of the latter hereinbefore mentioned, since the reproduction is not, in accordance with the present invention, dependent upon the small vibratory or oscillatory movements of any portion of the receiving apparatus. The capacity of the line has a tendency, when the rapidly varied or interrupted current is being transmitted, to cause the discoloring marks on the receiving surface to be elongated or distorted and thus to prevent sharp definition from being obtained; I, therefore, according to the present invention, obviate this tendency by passing along the line a steadying or counteracting current from the receiving station after each interruption of the line current in the opposite direction to that in which the line current traveled to the receiving station. This counteracting current may be so regulated as not to neutralize or obliterate the main current.

In place of the photographic film or print usually employed at the transmitting station, I employ a sheet of lead foil or other soft metal and produce upon it, in fish glue, or the like, an impression or negative of the photograph to be reproduced; this impression consists of lines, dots or patches, as usually obtained by means of a half-tone screen, the size of the said lines, dots or patches varying in accordance with the shade or density of coloring at different parts of the photograph to be transmitted. This impression or negative is pressed into the surface of the lead foil or sheet sufficiently to obtain a smooth surface. The circuit of the battery or other source of electric current at the transmitting station is completed through the lead foil and a stylus bearing upon its surface, and owing to the smoothness of the latter, the stylus responds precisely to the width of the fish glue lines, dots or patches composing the impression or negative, and does not scrape against the aforesaid lines, dots or patches on the lead foil when the latter is moved beneath the point of the stylus as hereinafter described. The lead foil print, as it may be called, at the transmitting station, and the sensitized paper or the like at the receiving station, are mounted upon revolving drums, and means are provided whereby the rotation of the transmitting drum automatically causes the aforesaid means to keep the receiving drum rotating in synchronism with the transmitting drum.

In order that the said invention may be clearly understood and readily carried into effect, the same will now be described more fully with reference to the accompanying diagrammatic drawings, in which:—

Figure 1 shows one arrangement of the transmitting apparatus. Fig. 2 shows one arrangement of the receiving apparatus, and Figs. 3 and 3ª show detail views hereinafter referred to.

The transmitting apparatus comprises the drum A and the stylus A', the latter being secured to an arm A² fixed to a nut mounted on a screw-threaded spindle A³ of the drum. The metal foil, with the impression or negative of a photograph or the like, is wrapped upon the drum, and the latter is rotated at a suitable speed, its spindle A³ simultaneously causing the stylus A' to travel longitudinally, and thereby trace out a spiral path upon the metal foil.

A⁴ is the main battery, the terminals of which are connected to contact pieces A⁵ A⁶ of the insulating forked lever A⁷. The lever A⁷ is normally held by a spring A⁸ so as to keep the contact pieces A⁵ A⁶ in contact with two stationary contacts E E', so that the electric current flows by way of the contact piece A⁵ and contact E, to the positive terminal Eˣ and thence to the line, returning by way of the negative terminal E⁰, lead e, stylus A', the metal foil on the drum A, the drum and its spindle A³, and the stationary contact E' and contact piece A⁶, back to the battery. An adjustable capacity or condenser A⁹ may be placed across the leads from the stylus A' and drum spindle A³ in order to make more abrupt the current interruptions produced by the stylus making and breaking contact with the exposed portions of the metal foil.

The receiving apparatus comprises the drum B and the stylus B'; the drum is rotated and the stylus caused to travel longitudinally as in the transmitting apparatus. The sensitized paper, capable of being stained by the electrolytic action of an electric current as hereinbefore mentioned, is wrapped upon the drum B. Every time the circuit of the battery A⁴ is completed in the transmitting apparatus, current flows from the line to the terminal Cˣ of the receiving apparatus and thence by way of the lead c⁶, variable inductance B², c⁴ and stylus B' to the paper, returning through the drum and drum spindle, the contacts c³ and c², the spring contact arm c' and the lead c to the terminal C⁰ and so back through the line. Every time the electrical circuit is completed through the sensitized paper, a black or colored mark or stain, the size of which varies in proportion to the width of the exposed portion of the metal of the metal foil print at the transmitting station, is produced upon the paper, and a reproduction of the photograph, picture, drawing, or the like is obtained by the production of innumerable marks spaced in proportion to the width of the lines, dots, or impressions of the metal foil print and in proper order.

In order to overcome the difficulties arising from the capacity of the line, which tends to create electrical surgings or oscillations the receiving apparatus is provided with a battery C (Fig. 2) arranged in series with a variable resistance C' and shunted by a condenser C². Current flows continuously through the lead c⁵, the contact c³, the drum B, the sensitized paper thereon, the stylus B' and the adjustable resistance C', and the direction in which it flows is opposite to that of the line current. This constant current will not discolor the paper because the stylus B' is not connected to that pole of the battery C which corresponds to the production of a colored substance, but it will prevent the discharges from the line from detrimentally affecting the production of a distinct mark of the correct length on the sensitized paper each time current flows from the transmitting station. Each time the stylus A' of the transmitting apparatus breaks contact with the metal foil, current from the battery C flows or "soaks" into the line, the direction in which it flows being opposite to that of the current that flows from the transmitting station to the receiving station. Also whenever the stylus A' of the transmitting apparatus makes contact with the metal foil a current from the battery C flows by way of the lead c⁵, contact c³, terminal c², spring contact arm c' and lead c to terminal C⁰, and thence to the line, and returns by way of the terminal Cˣ, lead c⁶, adjustable inductance B², lead c⁴ and adjustable resistance C' back to the battery. The inductive resistance C' and the condenser C² should be adjusted so as to cause the most abrupt or rapid discharge of the line.

It is necessary for the receiving drum to make the same number of revolutions in a given time as the transmitting drum. To insure this, the receiving apparatus is so constructed that the receiving drum is stopped at every revolution, and is released by electrical means automatically operated by the transmitting drum at each revolution of the latter. It is therefore convenient to drive the receiving drum at a slightly greater speed than the transmitting drum so that the stopping mechanism will stop it at the end of each revolution and hold it stationary ready to be released when the transmitting drum has completed a corresponding revolution. The arrangement is such that while the receiving drum B is being held, the stylus A' of the transmitting apparatus is traveling over a blank space on the transmitting drum. To enable the receiving drum B to be stopped without stopping the driving mechanism the driving shaft $d$ is connected to the spindle of the said drum through a friction clutch D. The stopping mechanism may comprise a stop $D^x$ suitably mounted to act in conjunction with a projection or tooth $D'^x$ on the drum B, and a tooth $D'$ adapted simultaneously to depress the spring contact arm $c'$ out of contact with the contact $c^2$ and into contact with the contact $c^{2x}$. At the moment when the transmitting drum A completes its revolution, a projection $A^{10}$ on the said drum A depresses the lever $A^7$ and thereby causes the contact pieces $A^5$ and $A^6$ to move away from the stationary contacts E, E' and into contact with the contacts $E^2$ and $E^3$. This movement of the lever $A^7$ reverses the direction of the current passing into the line from the battery $A^4$; this reverse line current flows through a polarized relay $D^2$, owing to the spring contact arm $c'$ being in contact with the contact $c^{2x}$, with the result that the relay tongue $D^3$ moves to close the circuit of a local battery $D^4$, the current from which energizes the electro-magnet $D^5$ which thereupon effects the removal of the stop $D^x$ from the path of the projection $D'^x$ on the drum B. The drum B is then free to rotate as before.

What I claim and desire to secure by Letters Patent of the United States is:—

1. In a phototelegraphic system, the combination with a source of electric current, of means at a transmitting station for interrupting the current for different periods of time corresponding to the variations of light and shade at different parts of the photograph to be transmitted, a sheet of material at a receiving station capable of being discolored by the passage of an electric current therethrough, means for enabling the interrupted passage of the current transmitted along the line to be recorded on the surface of the material by its discoloring effect, and at the receiving station for sending a current along the line, after each interruption of the line current, in the opposite direction to that in which the line current traveled to the receiving station.

2. In a phototelegraphic system, the combination with a source of electric current, of means at a transmitting station for interrupting the current for different periods of time corresponding to the variations of light and shade at different parts of the photograph to be transmitted, chemically prepared paper at a receiving station capable of being discolored by the passage of an electric current therethrough, a stylus having its point riding upon the paper and connected in circuit with the line, means for producing relative movement between the paper and the stylus, and means at the receiving station for sending a current along the line, after each interruption of the line current, in the opposite direction to that in which the line current traveled to the receiving station.

3. In a phototelegraphic system, the combination with a source of electric current, of means at a transmitting station for interrupting the current for different periods of time corresponding to the variations of light and shade at different parts of the photograph to be transmitted, a sheet of material at a receiving station capable of being discolored by the passage of an electric current therethrough, means for enabling the interrupted passage of the current transmitted along the line to be recorded on the surface of the material by its discoloring effect, a battery and a variable resistance in series at the receiving station and connected in shunt upon the line, and a variable condenser connected in shunt upon the said battery.

4. In a phototelegraphic system, the combination with a source of electric current, of means at a transmitting station for interrupting the current for different periods of time corresponding to the variations of light and shade at different parts of the photograph to be transmitted, chemically prepared paper at a receiving station capable of being discolored by the passage of an electric current therethrough, a stylus having its point riding upon the paper and connected in circuit with the line, a battery and a variable resistance in series at the receiving station and connected in shunt upon the line, and a variable condenser connected in shunt upon the said battery.

In testimony whereof I affix my signature in presence of two witnesses.

THOMAS THORNE BAKER.

Witnesses:
T. SELBY WARDLE,
WALTER J. SKERTEN.